(12) United States Patent
Merlau et al.

(10) Patent No.: US 10,612,785 B2
(45) Date of Patent: Apr. 7, 2020

(54) TOOL FOR REPAIRING OUT-OF-ROUND COMPONENT

(71) Applicant: General Electric Company, Schenectady, NY (US)

(72) Inventors: Thomas Michael Merlau, Greenville, SC (US); Joseph Daniel Becker, Travelers Rest, SC (US); Stuart Craig Hanson, Fair Play, SC (US); Brian Michael Leinonen, Anderson, SC (US); Gregory Scott Means, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 15/409,798

(22) Filed: Jan. 19, 2017

(65) Prior Publication Data
US 2018/0202664 A1 Jul. 19, 2018

(51) Int. Cl.
*F23R 3/50* (2006.01)
*B23P 6/00* (2006.01)
(Continued)

(52) U.S. Cl.
CPC .................. *F23R 3/50* (2013.01); *B21D 1/08* (2013.01); *B21D 3/14* (2013.01); *B21D 39/20* (2013.01);
(Continued)

(58) Field of Classification Search
CPC .............. F23R 3/50; F23R 2900/00019; F01D 25/285; B21D 3/14; B21D 1/08; B21D 39/20; B23P 6/002; B23P 2700/13; Y02T 50/671; F05D 2230/80
See application file for complete search history.

(56) References Cited

U.S. PATENT DOCUMENTS 2,643,562 A    6/1953  Geddes
3,677,058 A *  7/1972  Van Gompel ............ B21D 1/08
                                                  72/393
(Continued)

FOREIGN PATENT DOCUMENTS

JP    S5314948 U    2/1978
JP    S6089921 U    6/1985
(Continued)

OTHER PUBLICATIONS

Machine Translation for Matsuda, JP 2004-283847 A (Year: 2004).*
(Continued)

*Primary Examiner* — Christopher J Besler
*Assistant Examiner* — Christine Bersabal
(74) *Attorney, Agent, or Firm* — James Pemrick; Hoffman Warnick LLC (57) ABSTRACT

A tool for repairing an out-of-round component such as a combustor body is disclosed. The tool includes a base including a first arcuate member; a second arcuate member; and a linear actuator coupling the second arcuate member to the base. The linear actuator moves the second arcuate member between a retracted position out of engagement with the out-of-round component and an extended position in which the first arcuate member and the second arcuate member engage an interior surface of the out-of-round component in an opposing relationship to force the out-of-round component into a more round state compared to an initial state of the out-of-round component. A related method is also disclosed.

17 Claims, 6 Drawing Sheets

(51) Int. Cl.
  *B21D 1/08* (2006.01)
  *B21D 3/14* (2006.01)
  *B21D 39/20* (2006.01)
  *F01D 25/28* (2006.01)
(52) U.S. Cl.
  CPC ............ B23P 6/002 (2013.01); F01D 25/285 (2013.01); *B23P 2700/13* (2013.01); *F05D 2230/80* (2013.01); *F23R 2900/00019* (2013.01); *Y02T 50/671* (2013.01)

(56) References Cited

U.S. PATENT DOCUMENTS

| | | | |
|---|---|---|---|
| 3,817,079 A | 6/1974 | Priester | |
| 4,888,975 A | 12/1989 | Soward et al. | |
| 2011/0000087 A1* | 1/2011 | Lasser | B21D 1/08 29/894.353 |
| 2012/0111083 A1* | 5/2012 | Garza | B21D 1/08 72/370.08 |

FOREIGN PATENT DOCUMENTS

| | | | |
|---|---|---|---|
| JP | H0686826 U | | 12/1994 |
| JP | 2002172425 A | | 6/2002 |
| JP | 2004283847 A | * | 10/2004 |
| JP | 2011043124 A | | 3/2011 |

OTHER PUBLICATIONS

Extended European Search Report and Opinion issued in connection with corresponding EP Application No. 18152111.13-1019 dated May 28, 2018, 8 pages.

* cited by examiner

TOOL FOR REPAIRING OUT-OF-ROUND COMPONENT

BACKGROUND OF THE INVENTION

The disclosure relates generally to gas turbine repair, and more particularly, to a tool including expandable arcuate members to repair an out-of-round component such as a combustor body of a combustor for a gas turbine.

Gas turbines are used widely to generate power by combusting a fuel and directing a flow of combusted fuel through a turbine. In operation, compressed air and fuel are supplied to a combustor in which the fuel is combusted. The combusted fuel is then delivered to a turbine to generate power. Each combustor includes a fuel nozzle assembly having a fuel nozzle head end that is mounted in and mates with a combustor body, the latter of which includes a combustion chamber therein. The fuel nozzle assembly and the combustor body are typically round, i.e., annular or circular in cross-section. During the operation of the gas turbine, the combustor body experiences the most heat as it is exposed to the initial combustion of fuel/air Like all metals, when heated, the combustor body can experience stress relief. Current combustor bodies are made of a one-piece (unibody), thin-walled metal. During disassembly of the combustor, the combustor body will relax into a stress relieved state and may become out-of-round, i.e., not circular, not annular. Reassembling the combustor requires mating a round fuel nozzle head end in a round combustor body. An out-of-round combustor body, at best, prevents a rebuilt or new fuel nozzle head end from properly assembling, and at worst, can prevent assembly completely. Current practice to address this situation requires removal of the combustor body from the combustor, and forcibly reshaping the combustor body, e.g., using a circular mandrel. This re-rounding process is time consuming and expensive.

BRIEF DESCRIPTION OF THE INVENTION

A first aspect of the disclosure provides a tool for repairing an out-of-round component, the tool comprising: a base including a first arcuate member; a second arcuate member; and a linear actuator coupling the second arcuate member to the base, wherein the linear actuator moves the second arcuate member between a retracted position out of engagement with the out-of-round component and an extended position in which the first arcuate member and the second arcuate member engage an interior surface of the out-of-round component in an opposing relationship to force the out-of-round component into a more round state compared to an initial state of the out-of-round component.

A second aspect of the disclosure provides a method of repairing an out-of-round combustor body, comprising: positioning an expandable tool in the out-of-round combustor body in situ in a combustor casing, the expandable tool including: a base including a first arcuate member, the first arcuate member engaging the out-of-round combustor body, and a second arcuate member coupled to the base by a linear actuator; and first actuating the liner actuator to move the second arcuate member from a retracted position out of engagement with the out-of-round combustor body to an extended position in which the first arcuate member and the second arcuate member engage the out-of-round combustor body in an opposing relationship to force the out-of-round combustor body into a more round shape compared to the out-of-round combustor body.

A third aspect includes a method of repairing an out-of-round component, comprising: positioning an expandable tool in the out-of-round component, the expandable tool including: a base including a first arcuate member, the first arcuate member engaging the out-of-round component, and a second arcuate member coupled to the base by a linear actuator; and first actuating the liner actuator to move the second arcuate member from a retracted position out of engagement with the out-of-round component to an extended position in which the first arcuate member and the second arcuate member engage the out-of-round component in an opposing relationship to force the out-of-round component into a more round shape compared to the out-of-round component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple parts. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air and/or fuel through the combustor. The term "downstream" corresponds to the direction of flow of the fluid, and the term "upstream" refers to the direction opposite to the flow. The term "axial" refers to movement or position parallel to an axis. Finally, the term "circumferential" refers to movement or position around an axis. It will be appreciated that such terms may be applied in relation to the center axis of a combustor.

As indicated above, the disclosure provides a tool for re-shaping an out-of-round component. For purposes of description, the disclosure will explain the tool relative to a combustor body in situ within a combustor. However, as will be apparent, the teachings of the disclosure are applicable to practically any out-of-round component in any application. As will be described, the tool may re-shape out-of-round, single piece combustor bodies, allowing the re-assembly of fuel nozzle head ends during combustion inspections, and major inspections when fuel nozzle head ends are removed. The tool includes a pair of arcuate members capable of forcible expansion using a linear actuator to force the out-of-round combustor body to be more round. In one embodiment, the tool may be rotatable to further re-shape the combustor body.

Figure 1:
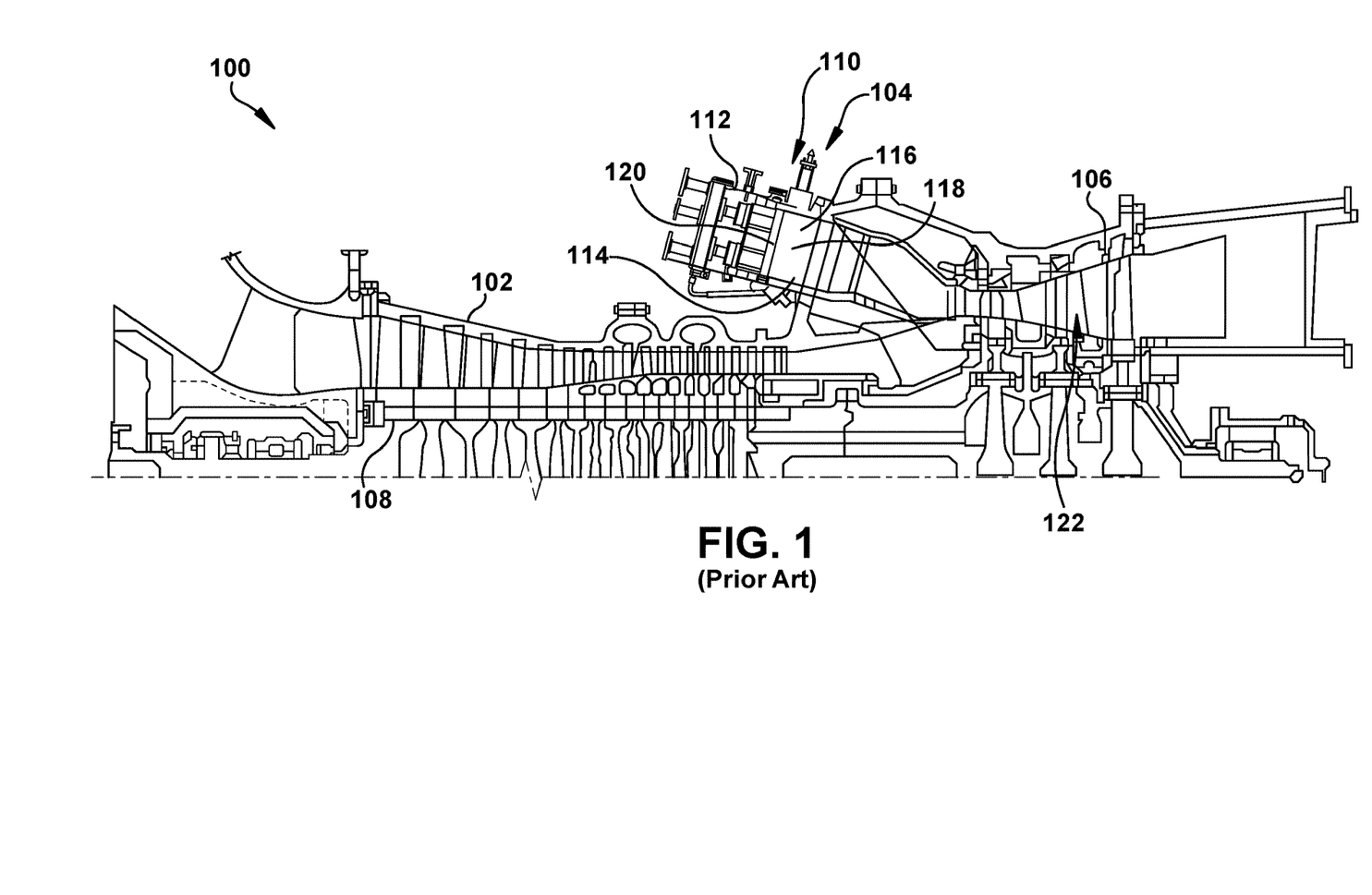
FIG. 1 shows a schematic view of an illustrative gas turbine system.

FIG. 1 shows a schematic illustration of an illustrative gas turbine system. Gas turbine system 100 includes a compressor 102, a combustor system 104 and a turbine 106. Gas turbine system 100 also includes a common compressor/turbine shaft 108 (sometimes referred to as a rotor 108) coupling compressor 102 and turbine 106. In one embodiment, gas turbine system 100 includes a MS7001FB engine, sometimes referred to as a 7FB engine, commercially available from General Electric Company, Greenville, S.C. The present disclosure is not limited to any one particular gas turbine system, and may be implanted in connection with other engines including, for example, the MS7001FA (7FA), the MS9001FA (9FA), the 7HA and the 9HA engine models of General Electric Company. Furthermore, the present disclosure is not limited to any particular gas turbine system type, and may be applicable to, for example, jet engines.

Combustor system 104 includes a number of combustors 110 circumferentially spaced upstream of turbine 106. Each combustor 110 includes a fuel nozzle assembly 112 mounted to a combustor casing 114 for mating with a combustor body 116 mounted in combustor casing 114. In operation, air flows through compressor 102 and compressed air is supplied to each combustor 110. Specifically, the compressed air is supplied to each fuel nozzle assembly 112. Each fuel nozzle assembly 112 is in flow communication with a respective combustor body 116 that provides a combustion chamber 118. Fuel nozzle assembly 112 is also in flow communication with a fuel source (not shown in FIG. 1) and channels fuel and air to combustor 110. Fuel nozzle assembly 112 includes a fuel nozzle head end 120 that mates with and is mounted relative to combustor body 116. Each combustor 110 ignites and combusts fuel within combustion chamber 118 of combustor body 116. Each combustor 110 is in flow communication with turbine 106 in which gas stream thermal energy is converted to mechanical rotational energy. Turbine 106 rotatably couples to and drives rotor 108. As noted, compressor 102 may also be rotatably coupled to rotor 108.

Figure 2:
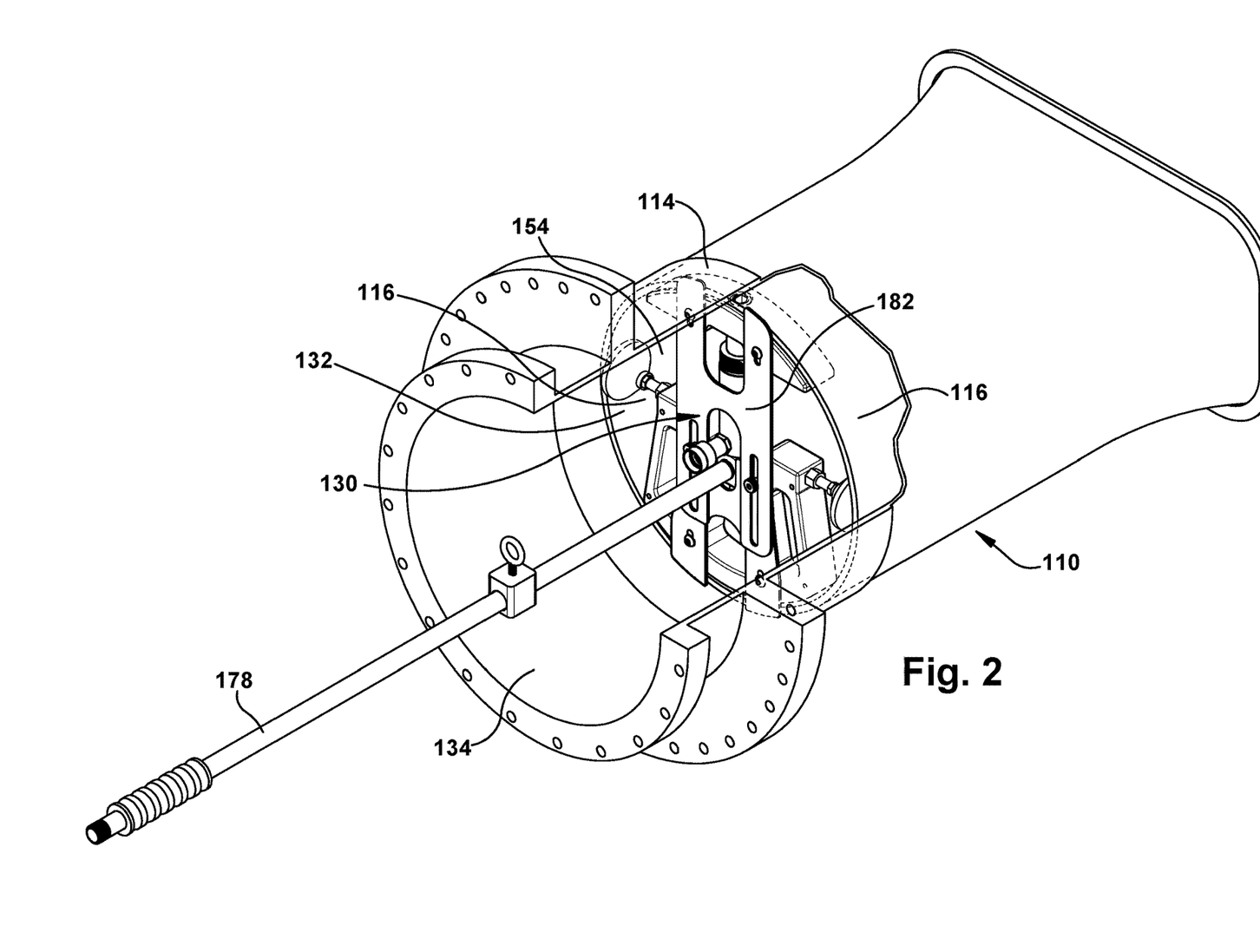
FIG. 2 shows a perspective view of a tool according to embodiments of the disclosure in position in situ in an out-of-round component such as a combustor body of a combustor.

FIG. 2 shows a perspective view of a single combustor 110 with fuel nozzle assembly head 120 (FIG. 1) removed, revealing combustor body 116 within combustor casing 114. Combustor body 116 is one example of an out-of-round component upon which a tool according to the disclosure may be applied. (Component or combustor body may both be referenced herein for clarity by numeral "116".) Combustor body 116 may include a single-piece (uni-body) thin-walled metal such as but not limited to high nickel alloys. Combustor body 116 includes a unitary band that is round in shape when initially manufactured. That is, it is a circular (annular) in cross-section so as to mount in a similarly round combustor casing 114. As noted herein, during use, combustor body 116 is exposed to extreme heat, e.g., currently between 1350° C. and 1750° C. Consequently, when gas turbine system 100 is shut down for maintenance, combustor body 116 may experience stress relief that deforms its shape to be out-of-round. Other components may experience similar stress relief in other applications that make them out-of-round. As used herein, "out-of-round" means not circular. The type of deformation that creates the out-of-round condition can take any form such as but not limited to: an indentation, or a distortion that creates a non-circular (non-annular) shape such as an oval or egg shape. In the out-of-round shape, a fuel nozzle head end 120, which is also round, cannot be inserted into combustor body 116, preventing re-installation of a rebuilt head end 120 or installation of a new head end 120.

Figure 3:
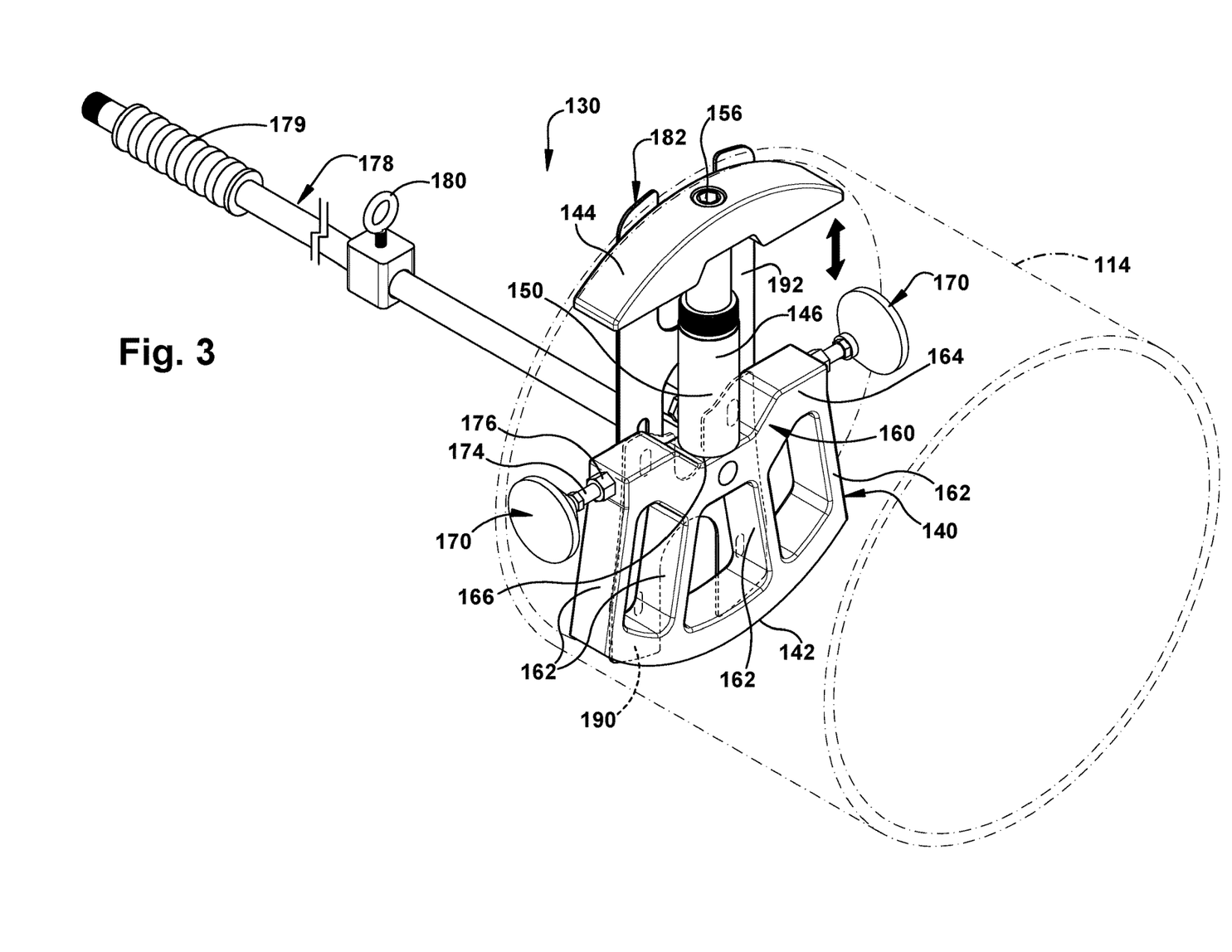
FIG. 3 shows a front perspective view of a tool according to embodiments of the disclosure.
Figure 4:
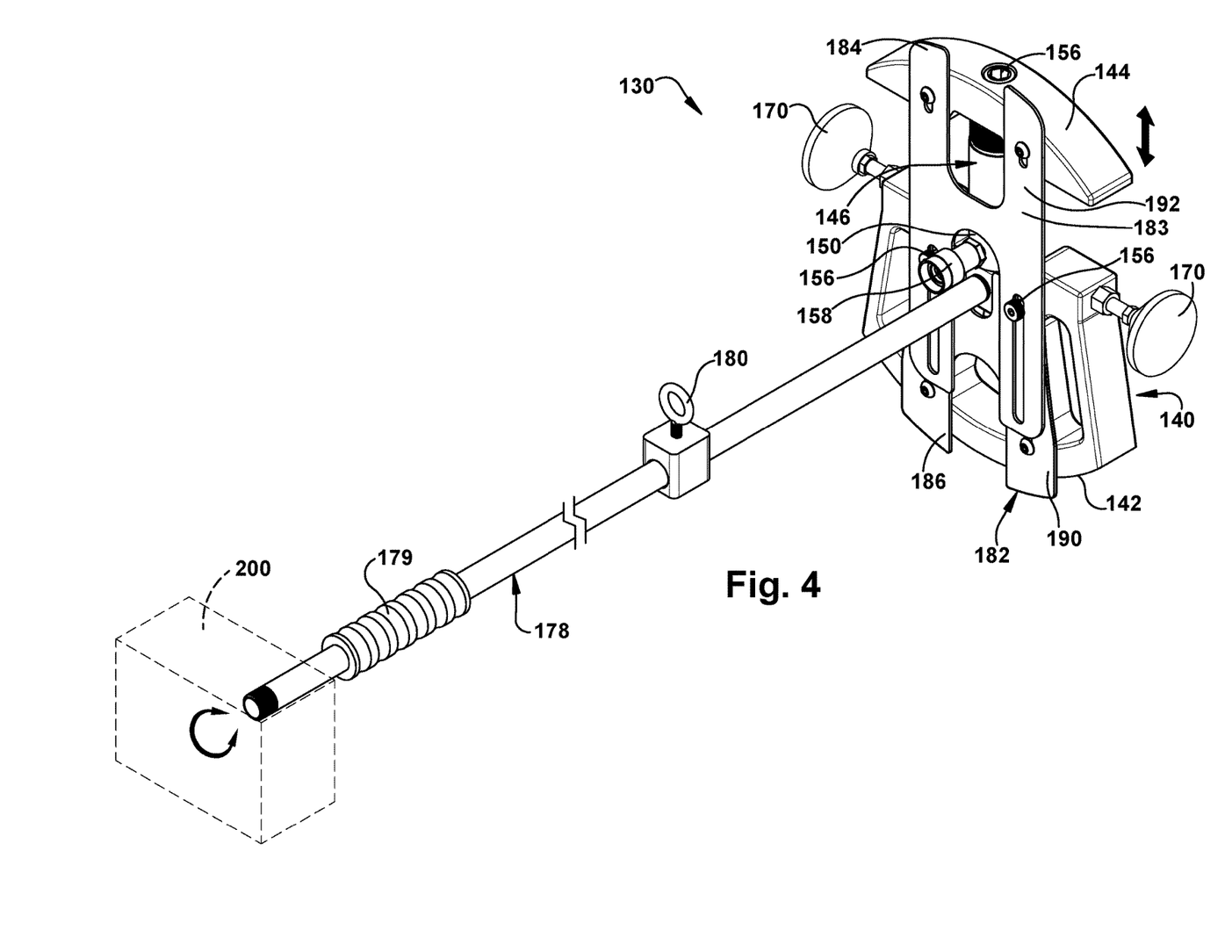
FIG. 4 shows a rear perspective view of a tool according to embodiments of the disclosure.

FIGS. 3 and 4 show a front and a rear perspective view, respectively, of an expandable tool 130 (hereinafter "tool") for repairing an out-of-round component such as combustor body 116 in situ in combustor casing 114. In the example described, combustor body 116 is in position as installed and is not removed from combustor casing 114 during use of tool 130. In this setting, combustor body 116 would be out-of-round and in need of re-shaping. Further, combustor body 116 would be accessible from where fuel nozzle assembly head end 120 (FIG. 1) was mounted. Combustor body 116 also would have a lip 132 on an upstream end thereof accessible from a larger opening 134 of combustor casing 114.

Tool 130 may include a base 140 including a first arcuate member 142. Tool 130 may also include a second arcuate member 144 coupled to base 140 by a linear actuator 146. That is, linear actuator 146 couples second arcuate member 144 to base 140. In one embodiment, linear actuator 146 includes an actuator base 150 fixedly mounted to base 140 and an actuating member 152 coupled to second arcuate member 144. It is understood however that linear actuator 146 may be reversed. As will be described in greater detail herein, linear actuator 146 moves second arcuate member 144 between a retracted position (FIGS. 3 and 4) out of engagement with the out-of-round component, e.g., combustor body 116, and an extended position (FIG. 5) in which first arcuate member 142 and second arcuate member 144 engage an interior surface 154 (FIG. 5) of the out-of-round component 116 in an opposing relationship to force the out-of-round component (combustor body) into a more round configuration.

Figure 5:
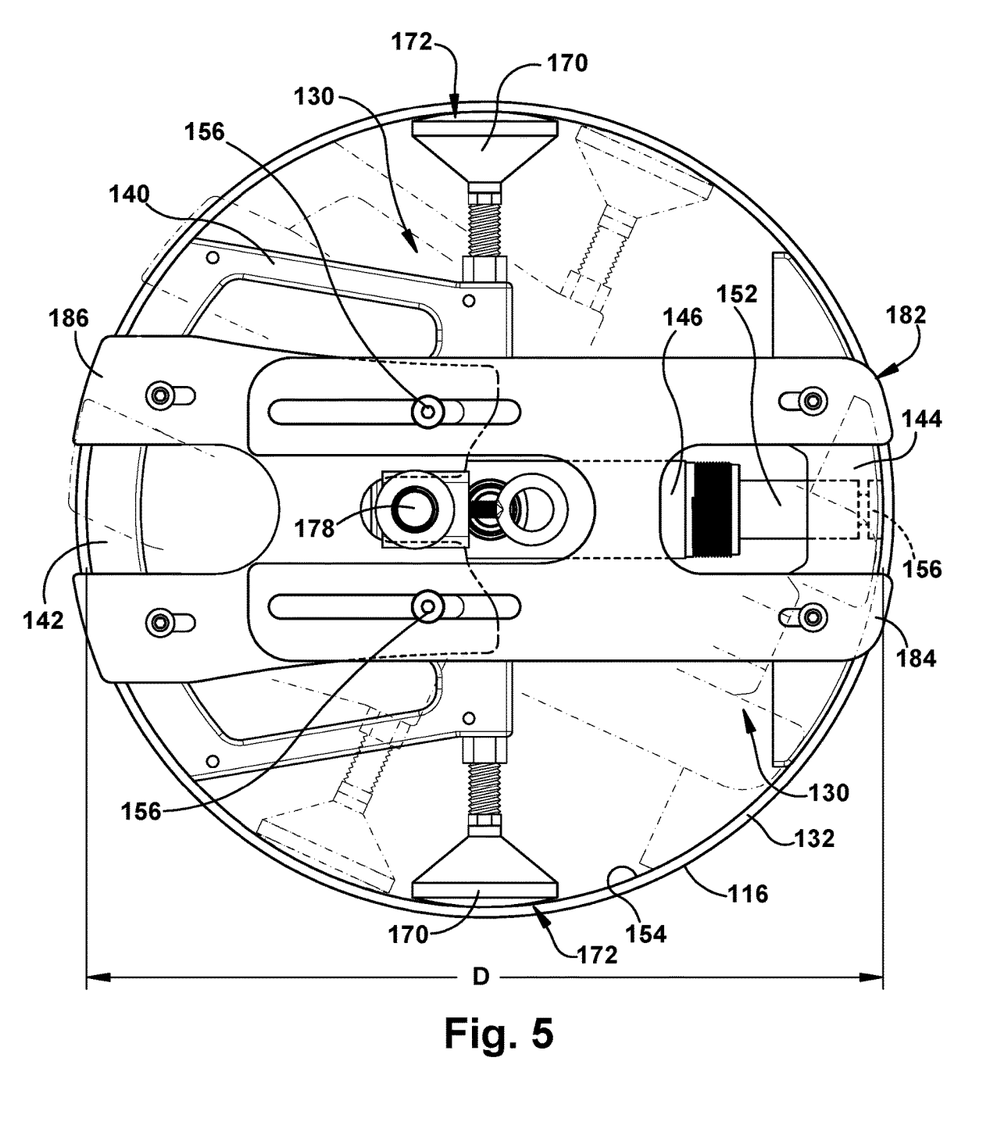
FIG. 5 shows a schematic view of the tool in operation in an out-of-round combustor body according to embodiments of the disclosure.

In one embodiment, as shown in FIGS. 3 and 4, first arcuate member 142 may be an integral part of base 140, i.e., they are one piece. Alternatively, as shown in FIG. 5, first arcuate member 142 may be a separate part mounted to base 140. In this latter case, first arcuate member 142 may be fastened to base 140 using any now known or later developed fastening system, e.g., threaded fasteners, welding, adhesives, etc. As shown best in FIGS. 3 and 4, second arcuate member 144 may be fastened to actuating member 152 in a similar fashion. In the example shown, second arcuate member 144 is fastened to actuating member 152 using a removable fastener 156, e.g., a threaded fastener that mates with an opening in base 140. Use of a removable fastener 156 may be advantageous where replacement of arcuate members 142, 144 is desired. For example, first arcuate member 142 and second arcuate member 144 are preferably shaped to cause a particular sized out-of-round component 116 to return to its round shape upon application of a force by members 142, 144. In this regard, arcuate members 142, 144 may be shaped to match the arc of the desired round component 116, or not match but configured to create the desired round component (e.g., over arced, under arced compared to the desired round combustor body or with different angle extents (10°, 15°, 20°), different widths, etc.). To accommodate different sized components 116, a set of paired arcuate members 142, 144 may also be employed, each pair with a different configuration, e.g., arc length, radius, width, etc. Each pair of arcuate members 142, 144 may be readily replaced with another set using replaceable fasteners 156, e.g., threaded fasteners that mount to actuating member 152 and/or base 140. Where first arcuate member 142 is integral with base 140, sets of varying configuration of bases 140 may also be employed.

Base 140, first arcuate member 142 and/or second arcuate member 144 may be made of a material having sufficient strength to withstand forcing combustor body 116 into a more round shape by application of force thereto with the arcuate members. Example materials include but are not limited to: carbon steel, stainless steel, metal alloy, tool steel, organic or inorganic plastic materials.

As shown best in FIG. 3, in one embodiment, base 140 may include an actuator mount 160 and a plurality of ribs 162 extending from actuator mount 160 for positioning first arcuate member 142 relative to actuator mount 160. Ribs 162, rather than a solid mass, may be advantageous to reduce the weight of tool 130. While four ribs 162 are illustrated, any number of ribs may be employed. In one embodiment, actuator mount 160 includes a laterally extending member 164 including a recess 166 therein at which linear actuator 146 is fixedly mounted to actuator mount 160, e.g., using a weld or removable fastener. In another embodiment, base 140 may be a solid mass.

Base 140 may further include a pair of opposing, lateral restraining elements 170 for restraining a portion 172 (FIG. 5) of out-of-round combustor body 116 in the extended position of the first and second arcuate members 142, 144. In one embodiment, pair of opposing, lateral restraining elements 170 may be coupled to opposing ends of laterally extending member 164. As shown in FIG. 5, restraining elements 170 assist in restraining a portion 172 of out-of-round component 116 in an extended position of the first and second arcuate members. That is, elements 170 restrain portion 172 from buckling inwardly or collapsing during repair of the out-of-round component 116 in the event that portion 172 collapses inwardly. Portion 172 may include, for example, a part of out-of-round component 116 that is approximately 90° (portion 172 centered at or +/−10° from 90°) from a center point of each arcuate member 142, 144. In this fashion, each of the pair of opposing, lateral restraining elements 170 may engage the out-of-round component 116 at approximately 90° from a center point of first and second arcuate members 142, 144. That stated, restraining elements 170 are typically not in engagement with portion 172 during insertion of tool 130 in the component. Where portion 172 does not at least partially buckle inwardly, elements 170 may never contact portion 172. Pair of opposing, lateral restraining elements 170 may be adjustable so as to adjust a distance between the pair of opposing, lateral restraining elements 170. In this fashion, restraining elements 170 may be adjustably positioned relative to laterally extending member 164 to accommodate different sized components. In one example, restraining elements 170 may be mounted to laterally extending member 164 using a threaded bolt 174 (FIG. 3), which can be selectively fixed relative to member 164 by tightening a nut 176 (FIG. 3) against laterally extending member 164. Other mechanisms for adjusting the position of restraining elements 170 are also possible and within the scope of the disclosure. Restraining elements 170 are shown as circular elements in FIGS. 3 and 4, but may have any shape desired. In FIG. 5, for example, they are arcuate.

As shown in FIGS. 3 and 4, tool 130 may also optionally include a handle 178 coupled to base 140 for positioning tool 130 relative to the out-of-round component 116. In the example shown, handle 178 includes a rod, which may optionally include a grip 179. However, handle 178 may include any structure capable of grasping by a user, e.g., a simple grip, etc. Handle 178 may also optionally include other features for positioning tool 130, e.g., an eye hook 180 for coupling to an overhead support (not shown) like a small crane.

Linear actuator 146 may use any now known or later developed motive force such as but not limited to hydraulics, pneumatics and/or electric motors. As illustrated, linear actuator 146 includes a hydraulic or pneumatic ram including actuator base 150 and linearly movable actuating member 152. Any necessary connections, e.g., supply/return conduits, electric power, etc., can be made to linear actuator 146 through base 140 via a coupling 158 (FIG. 4).

As shown in FIGS. 3-5, tool 130 may also include a depth stop 182 coupled to base 140 to position base 140 relative to a depth of out-of-round combustor body 116. In one embodiment, shown in FIG. 5, depth stop 182 may include a plate 183 having a dimension (e.g., length) greater than an opening dimension (e.g., diameter of lip 132) of the out-of-round component 116. In this case, plate 183 may have opposing ends 184, 186 that engage lip 132 of the out-of-round component 116. In this case, each size of component may have a respective depth stop 182 for selective mounting to body 140, e.g., using removable fasteners 156. Alternatively, as shown in FIGS. 3 and 4, depth stop 182 may include a first plate 190 coupled to base 140 and a second plate 192 coupled to second arcuate member 144. Each plate 190, 192 extends beyond a respective arcuate members' 142, 144 outer surface. Here, first plate 190 and second plate 192 are slidingly coupled to one another, e.g., via fasteners in body 140 that extend into slots in one or more plates 190, 192. Plates 190, 192 collectively have a dimension (length) greater than the opening dimension (e.g., diameter of lip 132) of out-of-round component 116. In this embodiment, as arcuate members 142, 144 move to the extended position under influence of linear actuator 146, plates 190, 192 slide relative to one another, creating a self-adjusting depth step that can accommodate a variety of sizes of component 116 diameters, e.g., within a minimum and maximum distance of arcuate members 142, 144 dictated by the stroke length of actuating member 152. In either embodiment, in operation, depth stop 182 rests against lip 132, which positions tool 130 in a position to repair out-of-round combustor body 116.

Depth stop 182 may also include any ancillary structure, e.g., spacers between plate 183, or plates 190 and 192, and base 140, to accommodate changing the depth to which arcuate member 142, 144 extend into body 116. A depth to which tool 130 extends into out-of-round combustor body 116 may also be adjusted by changing a width of arcuate members 142 and/or 144 (i.e., perpendicular to arc length), thus changing the distance the arcuate members extend into body 116.

Figure 6:
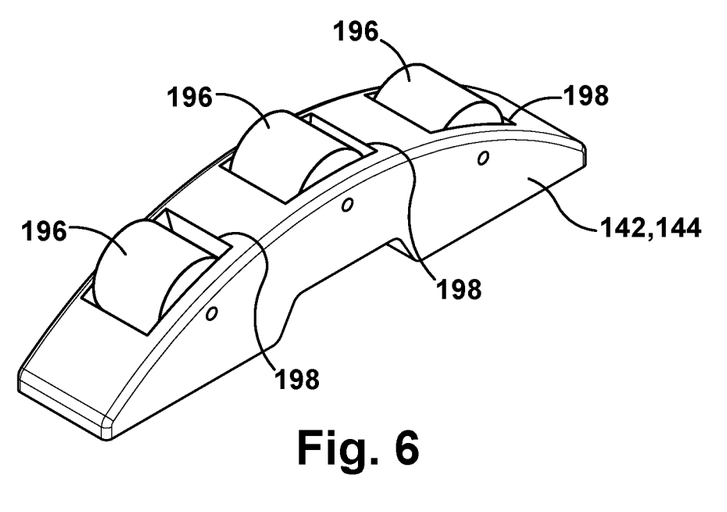
FIG. 6 shows a perspective view of arcuate member(s) of a tool including rollers according to alternative embodiments of the disclosure.

FIG. 6 shows an optional embodiment in which a plurality of rollers 196 are embedded in a one or more openings 198 in a surface of each of first and second arcuate members 142, 144. Rollers 196 may be mounted in one or more openings 198 in arcuate member(s) 142, 144 and may be mounted using any now known or later developed fashion, e.g., turning axes extending therethrough and mounted in members 142, 144. Rollers 196 may be made from the same materials as arcuate members 142, 144, or may be made of a softer material such as a polymer. Rollers 196 allow arcuate members 142, 144 to selectively roll against and along interior surface 154 (FIG. 4) such that tool 130 can expand the area of influence of arcuate members 142, 144. Tool 130 may be manually turned, e.g., using handle 178. Alternatively, as shown in phantom in FIG. 4, tool 130 may also include a drive mechanism 200 for causing base 140 and first and second arcuate members 142, 144 to turn in engagement with interior surface 154 (FIG. 5) of out-of-round combustor body 116 in the extended position. FIG. 5 shows tool 130 in a turned position in phantom. Drive mechanism 200 may include any now known or later developed rotational drives such as but not limited to a hydraulic, pneumatic or electric motor. Drive mechanism 200 may be able to drive tool 130 in a counterclockwise and/or clockwise direction. While drive mechanism 200 is shown using handle 178 as a drive shaft, it is understood that it can be directly coupled to base 140, e.g., by a shorter drive shaft.

In operation, tool 130 is positioned in out-of-round combustor body 116 in situ in combustor casing 114 (FIG. 2). That is, only fuel nozzle assembly head end 120 (FIG. 1) is removed from combustor 104 (FIG. 1). The positioning may also include controlling a depth of tool 130 within the out-of-round combustor body 116. That is, depth stop 182 or other structure described herein may be used to prevent tool 130 from extending too far into out-of-round combustor body 116. A distance between pair of opposing, lateral restraining elements 170 may be adjusted prior to positioning tool 130 in combustor body 116 to accommodate any size body 116.

Next, linear actuator 146 is actuated to move second arcuate member 144 between a retracted position (FIGS. 3 and 4) out of engagement with out-of-round combustor body 116 and an extended position (FIG. 5) in which first arcuate member 142 and second arcuate member 144 engage interior surface 154 (FIG. 5) of out-of-round combustor body 116 in an opposing relationship. Arcuate members 142, 144 force out-of-round combustor body 116 into a more round state compared to an initial state of the out-of-round combustor body. In contrast to some expander systems, second arcuate member 144 moves in the same linear direction as actuating member 152 of linear actuator 146. First member 142 being coupled to base 140 also moves in the same linear direction as actuating member 152. Consequently, there is no translating transmission between actuating member 152 and arcuate members 142, 144, e.g., with pivoting linkages or slidable engagement between parts. Tool 130 is therefore less heavy, less expensive to produce and easier to maintain than conventional expanders having such transmissions. Further, arcuate members 142, 144 and linear actuator 146 extend in a single plane, which also simplifies tool 130 and provides direct application of linear actuator's 146 force to body 116 in a consistent manner, e.g., there is no change in force as a translating transmission shifts. In one embodiment, in the extended position (FIG. 5), first and second arcuate members 142, 144 define a setting diameter D larger than an intended round diameter of out-of-round combustor body 116. That is, arcuate members 142, 144 force combustor body 116 past the intended round diameter to cause re-shaping such that when arcuate member 142, 144 are released, the body 116 has, or nearly has, the intended round diameter. In the extended position in body 116, restraining members 170 may restrain portion 172 of body 116 from collapsing or buckling where arcuate members 142, 144 do not engage the body.

If body 116 is not repaired sufficiently with the above process, linear actuator 146 may then be actuated to move second arcuate member 144 from the extended positon (FIG. 5) to the retracted position (FIGS. 3 and 4) out of engagement with out-of-round combustor body 116. Tool 130 may then be re-positioned, as shown in phantom in FIG. 5, in (still) out-of-round combustor body 116 in situ in the combustor casing 114 (FIG. 2). The re-positioning may be to any location which is anticipated to improve the roundness of body 116, e.g., a certain rotational degree from where initially expanded. Linear actuator 146 may then be re-actuated to move second arcuate member 144 from the retracted position to the extended position to again force out-of-round combustor body 116 into a more round shape compared to the out-of-round combustor body after the first actuating. The above-described process may repeat as many times as is necessary until out-of-round body 116 reaches a desired roundness.

In an alternative embodiment, as also shown in phantom in FIG. 5 (see rotational arrows therein), where tool 130 includes rollers 196 (FIG. 6) or rollers 196 and drive mechanism 200, tool 130 may be turned in the extended position. The turning increases the area upon which arcuate members 142, 144 act to reshape out-of-round combustor body 116. The turning may extend to any degree desired (1°-360°), and may repeat as many times as is necessary until out-of-round body 116 reaches a desired roundness.

As described herein, tool 130 may be used to repair by reshaping an out-of-round combustor body 116 in situ in a combustor casing. Tool 130 is light weight, easy to use and performs well to re-shape body 116 such that fuel nozzle head end 122 (FIG. 1) can successfully be re-assembled during outages or combustion upgrades. Without tool 130, combustor bodies 116 need to be fully removed, sent out for repair, and the repaired body or a new body needs to be installed. Tool 130 avoids these activities, and is thus less expensive and less time consuming to use.

It should also be noted that in some alternative implementations, the acts noted herein may occur out of the order noted or, for example, may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tool for repairing an out-of-round component, the tool comprising:
   a base including a first arcuate member, the first arcuate member including a shape to match a desired arc for the out-of-round component and an arcuate outer surface configured to contact an interior surface of the out-of-round component;
   a second arcuate member positioned opposite the first arcuate member, the second arcuate member including a shape to match the desired arc for the out-of-round component and an arcuate outer surface configured to contact the interior surface of the out-of-round component, opposite the first arcuate member;
   a pair of opposing, lateral restraining elements coupled to and extending from the base, each of the pair of opposing, lateral restraining elements positioned circumferentially between the first arcuate member and the second arcuate member and configured to contact the interior surface of the out-of-round component;
   a linear actuator coupling the second arcuate member to the base,
   wherein the linear actuator moves the second arcuate member between a retracted position out of engagement with the out-of-round component and an extended position in which the arcuate outer surface of the first arcuate member and the arcuate outer surface of the second arcuate member engage the interior surface of the out-of-round component in an opposing relationship to force the out-of-round component into a more round state compared to an initial state of the out-of-round component; and
   a depth stop coupled to the base to position the base relative to a depth of the out-of-round component, the depth stop including at least one plate extending radially beyond the arcuate outer surface of at least one of the first arcuate member or the second arcuate member.

2. The tool of claim 1, further comprising a handle coupled to the base for positioning the tool relative to the out-of-round component.

3. The tool of claim 1, wherein the base further includes:
   an actuator mount; and
   a plurality of ribs extending from the actuator mount for positioning the first arcuate member relative to the actuator mount.

4. The tool of claim 3, wherein the actuator mount includes a laterally extending member including a recess therein at which the linear actuator is fixedly mounted to the actuator mount.

5. The tool of claim 4, wherein the pair of opposing, lateral restraining elements are coupled to opposing ends of the laterally extending member.

6. The tool of claim 1, wherein the second arcuate member moves in the same linear direction as an actuating member of the linear actuator.

7. The tool of claim 1, wherein the pair of opposing, lateral restraining elements are adjustable so as to adjust a distance between the pair of opposing, later restraining elements.

8. The tool of claim 1, wherein each of the pair of opposing, lateral restraining elements engage the out-of-round component at approximately 90° from a center point of the first and second arcuate members.

9. The tool of claim 1, wherein the depth stop includes a plate having a dimension greater than an opening dimension of the out-of-round component.

10. The tool of claim 1, wherein the depth stop includes a first plate coupled to the base and a second plate coupled to the second arcuate member, wherein the first plate and second plate are slidingly coupled to one another and collectively have the dimension greater than the opening dimension of the out-of-round component.

11. The tool of claim 1, wherein, in the extended position, the first and second arcuate members define a setting diameter larger than an intended round diameter of the out-of-round component.

12. The tool of claim 1, further comprising a plurality of rollers embedded in a surface of each of the first and second arcuate members that engages the interior surface of the out-of-round component in the extended position.

13. The tool of claim 12, further comprising a drive mechanism for causing the base and the first and second arcuate members to turn in engagement with the interior surface of the out-of-round component in the extended position.

14. The tool of claim 1, wherein the out-of-round component includes an out-of-round combustor body of a combustor.

15. A tool for repairing an out-of-round component, the tool comprising:
   a base including a first arcuate member, the first arcuate member including a shape to match a desired arc for the out-of-round component and an arcuate outer surface configured to contact an interior surface of the out-of-round component;

a second arcuate member positioned opposite the first arcuate member, the second arcuate member including a shape to match the desired arc for the out-of-round component and an arcuate outer surface configured to contact the interior surface of the out-of-round component, opposite the first arcuate member;

a depth stop coupled to the base, the depth stop including:
at least one plate extending radially beyond the arcuate outer surface of at least one of the first arcuate member or the second arcuate member; and a linear actuator coupling the second arcuate member to the base, wherein the linear actuator moves the second arcuate member between a retracted position out of engagement with the out-of-round component and an extended position in which the arcuate outer surface of the first arcuate member and the arcuate outer surface of the second arcuate member engage the interior surface of the out-of-round component in an opposing relationship to force the out-of-round component into a more round state compared to an initial state of the out-of-round component.

16. The tool of claim 15, wherein the at least one plate of the depth stop includes:
a first plate coupled to the base, the first plate including an end extending radially beyond the first arcuate member; and a second plate coupled to the second arcuate member, the second plate including an end extending radially beyond the second arcuate member, wherein the first plate and second plate are slidingly coupled to one another and collectively have the dimension greater than the opening dimension of the out-of-round component in response to the linear actuator moves the second arcuate member to the extended position.

17. The tool of claim 15, further comprising a pair of opposing, lateral restraining elements coupled to and extending from the base, each of the pair of opposing, lateral restraining elements positioned circumferentially between the first arcuate member and the second arcuate member and configured to contact the interior surface of the out-of-round component.

* * * * *